United States Patent
Harris

(10) Patent No.: US 11,617,074 B2
(45) Date of Patent: Mar. 28, 2023

(54) SECURE BOUNDARY AREA COMMUNICATION SYSTEMS AND METHODS

(71) Applicant: TOYOTA MOTOR NORTH AMERICA, INC., Plano, TX (US)

(72) Inventor: Randall Mason Harris, Dallas, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 292 days.

(21) Appl. No.: 16/902,219

(22) Filed: Jun. 15, 2020

(65) Prior Publication Data
US 2021/0392493 A1 Dec. 16, 2021

(51) Int. Cl.
| | | |
|---|---|---|
| H04W 12/02 | (2009.01) | |
| G06N 5/04 | (2006.01) | |
| G06N 20/00 | (2019.01) | |
| H04L 67/04 | (2022.01) | |
| H04L 67/06 | (2022.01) | |
| H04W 4/40 | (2018.01) | |
| H04W 12/00 | (2021.01) | |
| H04W 12/63 | (2021.01) | |
| H04W 4/029 | (2018.01) | |

(Continued)

(52) U.S. Cl.
CPC ............. *H04W 12/02* (2013.01); *G06N 5/04* (2013.01); *G06N 20/00* (2019.01); *H04L 67/04* (2013.01); *H04L 67/06* (2013.01); *H04W 4/40* (2018.02); *H04W 12/009* (2019.01); *H04W 12/63* (2021.01)

(58) Field of Classification Search
CPC ..... H04W 4/40; H04W 12/009; H04W 12/02; H04W 12/63; G06N 20/00; G06N 5/04; H04L 67/04; H04L 67/06
See application file for complete search history.

(56) References Cited

U.S. PATENT DOCUMENTS 4,303,904 A * 12/1981 Chasek .................... G07F 7/02
340/928
5,101,200 A * 3/1992 Swett ................... G07B 15/063
340/928

(Continued)

FOREIGN PATENT DOCUMENTS

KR 101850254 4/2018

OTHER PUBLICATIONS

International Search Report for PCT/US2021/037182 completed Sep. 29, 2021 & dated Oct. 1, 2021.

(Continued)

*Primary Examiner* — Jenee Holland
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for secure vehicular communications, including determining a size of a file to be transferred to or from a vehicle; determining the data transfer speed at which the file may be transferred; based on the file size and transfer speed, determining a travel distance of the vehicle needed to complete transfer of the file; assigning a secure data transfer zone in which to perform the transfer based on the determined travel distance and based on a size of the secure data transfer zone.

22 Claims, 5 Drawing Sheets

(51) Int. Cl.
  *H04L 67/12* (2022.01)
  *H04W 12/12* (2021.01)

(56) References Cited

U.S. PATENT DOCUMENTS

| | | | | |
|---|---|---|---|---|
| 5,424,727 | A * | 6/1995 | Shieh | G08G 1/017 |
| | | | | 340/10.5 |
| 5,642,093 | A * | 6/1997 | Kinoshita | B60K 28/066 |
| | | | | 348/148 |
| 6,091,344 | A * | 7/2000 | Park | G08G 1/01 |
| | | | | 340/928 |
| 6,492,897 | B1 * | 12/2002 | Mowery, Jr. | H04B 3/54 |
| | | | | 340/505 |
| 6,665,613 | B2 | 12/2003 | Duvall | |
| 6,873,905 | B2 * | 3/2005 | Endo | G08G 1/096844 |
| | | | | 701/428 |
| 7,818,380 | B2 | 10/2010 | Tamura | |
| 9,031,732 | B1 * | 5/2015 | Cudak | G01C 21/26 |
| | | | | 701/23 |
| 9,672,734 | B1 * | 6/2017 | Ratnasingam | H04W 4/44 |
| 9,788,160 | B1 * | 10/2017 | Gu | H04W 4/021 |
| 10,115,164 | B1 * | 10/2018 | Binion | B60W 50/14 |
| 10,132,932 | B1 * | 11/2018 | McConville | G08G 5/0091 |
| 10,499,446 | B1 * | 12/2019 | Dowlatkhah | H04W 4/08 |
| 2003/0060938 | A1 * | 3/2003 | Duvall | B60R 25/1012 |
| | | | | 701/2 |
| 2004/0004120 | A1 * | 1/2004 | Kojima | G08G 1/015 |
| | | | | 235/384 |
| 2006/0149463 | A1 * | 7/2006 | Machii | G08G 1/202 |
| | | | | 701/533 |
| 2011/0219424 | A1 | 9/2011 | Panasyuk | |
| 2012/0172010 | A1 * | 7/2012 | Oman | G07C 5/008 |
| | | | | 455/414.1 |
| 2014/0188376 | A1 * | 7/2014 | Gordon | G08G 1/09 |
| | | | | 701/119 |
| 2015/0135336 | A1 | 5/2015 | Arasavelli | |
| 2016/0049014 | A1 | 2/2016 | Wells | |
| 2016/0143070 | A1 * | 5/2016 | Liyanage | H04L 63/0428 |
| | | | | 370/329 |
| 2017/0366930 | A1 * | 12/2017 | Treman | H04W 4/021 |
| 2018/0174449 | A1 * | 6/2018 | Nguyen | G08G 1/08 |
| 2018/0204399 | A1 * | 7/2018 | Newman | G07C 9/28 |
| 2018/0225962 | A1 * | 8/2018 | Nakamura | G08G 1/0133 |
| 2018/0321047 | A1 | 11/2018 | Sagawa | |
| 2019/0057217 | A1 * | 2/2019 | Link, II | H04L 67/06 |
| 2019/0061686 | A1 * | 2/2019 | Neuhoff | H04W 4/023 |
| 2019/0228593 | A1 * | 7/2019 | Liu | G08G 1/0141 |
| 2019/0235499 | A1 * | 8/2019 | Kazemi | G01S 17/931 |
| 2019/0279437 | A1 * | 9/2019 | Borras | G07B 15/063 |
| 2019/0340928 | A1 * | 11/2019 | Goldman | G08G 1/202 |
| 2020/0010077 | A1 * | 1/2020 | Cormack | B60W 40/08 |
| 2020/0027344 | A1 * | 1/2020 | Gerges | G07B 15/06 |
| 2020/0068434 | A1 * | 2/2020 | Pedersen | H04L 67/12 |
| 2020/0117194 | A1 * | 4/2020 | Gu | G06N 5/046 |
| 2020/0139995 | A1 * | 5/2020 | Loch | H04L 63/18 |
| 2021/0333113 | A1 * | 10/2021 | Prabhudeva | G08G 1/0129 |
| 2022/0046728 | A1 * | 2/2022 | Kopchinsky | H04W 4/46 |

OTHER PUBLICATIONS

Written Opinion for PCT/US2021/037182 completed Sep. 29, 2021 & dated Oct. 1, 2021.

* cited by examiner

SECURE BOUNDARY AREA COMMUNICATION SYSTEMS AND METHODS

TECHNICAL FIELD

The present disclosure relates generally to secure communications, and in particular, some implementations may relate to secure data transfers in a geofenced region.

DESCRIPTION OF RELATED ART

Connected vehicle technology is growing in importance and popularity seemingly exponentially as autonomous vehicle and ADAS technologies are playing an increasing role in vehicle operations. Vehicle to vehicle (V2V) and vehicle to infrastructure (V2I) wireless communication (collectively referred to as V2X) enable vehicles to communicate with each other and with infrastructure elements (e.g., road signs, smart highway elements and so on).

An important aspect for the successful deployment of vehicular communications is security of the communications. For example, these potentially life-critical communications should be secured from attacks or modifications by hackers, and private information should also be protected. However, implementing security measures can be difficult in the specific operational environment of vehicles (e.g., moving vehicles, sporadic connectivity, exposed to nearby would-be hackers etc.).

BRIEF SUMMARY OF THE DISCLOSURE

According to various embodiments of the disclosed technology a method for secure data transfer with a vehicle may include: determining a size of a file to be transferred to or from the vehicle; determining the data transfer speed at which the file may be transferred; based on the file size and transfer speed, determining a travel distance of the vehicle needed to complete transfer of the file; assigning a secure data transfer zone in which to perform the transfer based on the determined travel distance and based on a size of the secure data transfer zone.

In various embodiments, assigning a secure data transfer zone may include identifying an existing secure data transfer zone of sufficient size to perform the transfer and assigning the identified secure data transfer zone to perform the transfer. In embodiments, assigning a secure data transfer zone may include identifying an existing secure data transfer zone to perform the transfer, dynamically changing boundaries of the identified secure data transfer zone to accommodate the determined travel distance for the transfer, and assigning the identified secure data transfer zone for the transfer.

The assigned secure data transfer zone may include a plurality of secure data transfer zones of sufficient cumulative size to perform the transfer.

The method may further include adjusting boundaries of one or more of the plurality of secure data transfer zones so that the plurality of secure data transfer zones comprise sufficient cumulative size to accommodate the determined travel distance.

Assigning a secure data transfer zone may include creating a new secure data transfer zone or a plurality of new secure data transfer zones of sufficient size to accommodate the determined travel distance.

The method may further include predicting a speed of the vehicle during its travel through the assigned secure data transfer zone, and further using the predicted vehicle speed to determine the travel distance of the vehicle needed to complete transfer of the file. The method may further include predicting a path of the vehicle, determining one or more available secure data transfer zones in the path of the vehicle predicted, and assigning a secure data transfer zone may include assigning one or more of the one or more available secure data transfer zones.

In various embodiments, one or more available secure data transfer zones comprise one or more existing secure data transfer zones, one or more dynamically created secure data transfer zones or a combination of at least one existing and at least one dynamically created secure data transfer zone.

In various embodiments, predicting a path of the vehicle is performed using machine learning.

A non-transitory machine-readable medium having instructions stored therein, which when executed by a processor, cause the processor to perform operations, the operations may include: determining a size of a file to be transferred to or from the vehicle; determining the data transfer speed at which the file may be transferred; based on the file size and transfer speed, determining a travel distance of the vehicle needed to complete transfer of the file; assigning a secure data transfer zone in which to perform the transfer based on the determined travel distance and based on a size of the secure data transfer zone.

A system for secure vehicle communication may include: a processor; and a memory coupled to the processor to store instructions, which when executed by the processor, cause the processor to perform operations, the operations may include: determining a size of a file to be transferred to or from the vehicle; determining the data transfer speed at which the file may be transferred; based on the file size and transfer speed, determining a travel distance of the vehicle needed to complete transfer of the file; assigning a secure data transfer zone in which to perform the transfer based on the determined travel distance and based on a size of the secure data transfer zone.

In various embodiments, assigning a secure data transfer zone may include identifying an existing secure data transfer zone of sufficient size to perform the transfer and assigning the identified secure data transfer zone to perform the transfer. In embodiments, assigning a secure data transfer zone may include identifying an existing secure data transfer zone to perform the transfer, dynamically changing boundaries of the identified secure data transfer zone to accommodate the determined travel distance for the transfer, and assigning the identified secure data transfer zone for the transfer.

The assigned secure data transfer zone may include a plurality of secure data transfer zones of sufficient cumulative size to perform the transfer.

The operations may further include adjusting boundaries of one or more of the plurality of secure data transfer zones so that the plurality of secure data transfer zones comprise sufficient cumulative size to accommodate the determined travel distance.

Assigning a secure data transfer zone may include creating a new secure data transfer zone or a plurality of new secure data transfer zones of sufficient size to accommodate the determined travel distance.

The operations may further include predicting a speed of the vehicle during its travel through the assigned secure data transfer zone, and further using the predicted vehicle speed to determine the travel distance of the vehicle needed to complete transfer of the file. The method may further include predicting a path of the vehicle, determining one or more available secure data transfer zones in the path of the vehicle predicted, and assigning a secure data transfer zone may include assigning one or more of the one or more available secure data transfer zones.

In various embodiments, one or more available secure data transfer zones comprise one or more existing secure data transfer zones, one or more dynamically created secure data transfer zones or a combination of at least one existing and at least one dynamically created secure data transfer zone.

In various embodiments, predicting a path of the vehicle is performed using machine learning.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can provide systems and methods for coordinating secure vehicular communications with one or more secure communication zones. Embodiments may be configured to recognize that secure information is to be uploaded from or downloaded to a vehicle and work to schedule the transfer. The system can be configured to determine the size of a file to be transferred to or from the vehicle and the data transfer speed at which the file may be transferred. Using this information and the predicted vehicle speed, the system can determine a travel distance of the vehicle that is needed to complete transfer of the file. With this information, the system can assign one or more secure data transfer zones in which to perform the transfer based on the determined travel distance and based on a size of the secure data transfer zone or zones.

Where dimensions of existing secure communication zones are insufficient to accommodate the transfer (e.g., the vehicle will pass through the zone(s) too quickly to complete the transfer), the system may dynamically add one or more new secure communication zones, or dynamically increase the dimensions of one or more existing secure communication zones, or both, to accommodate the transfer.

The systems and methods disclosed herein may be implemented with any of a number of different vehicles and vehicle types, including autonomous or semi-autonomous vehicles. For example, the systems and methods disclosed herein may be used with automobiles, trucks, motorcycles, recreational vehicles and other like on- or off-road vehicles. These can include vehicles for transportation of people/personnel, materials or other items. In addition, the principals disclosed herein may also extend to other vehicle types as well.

Figure 1:
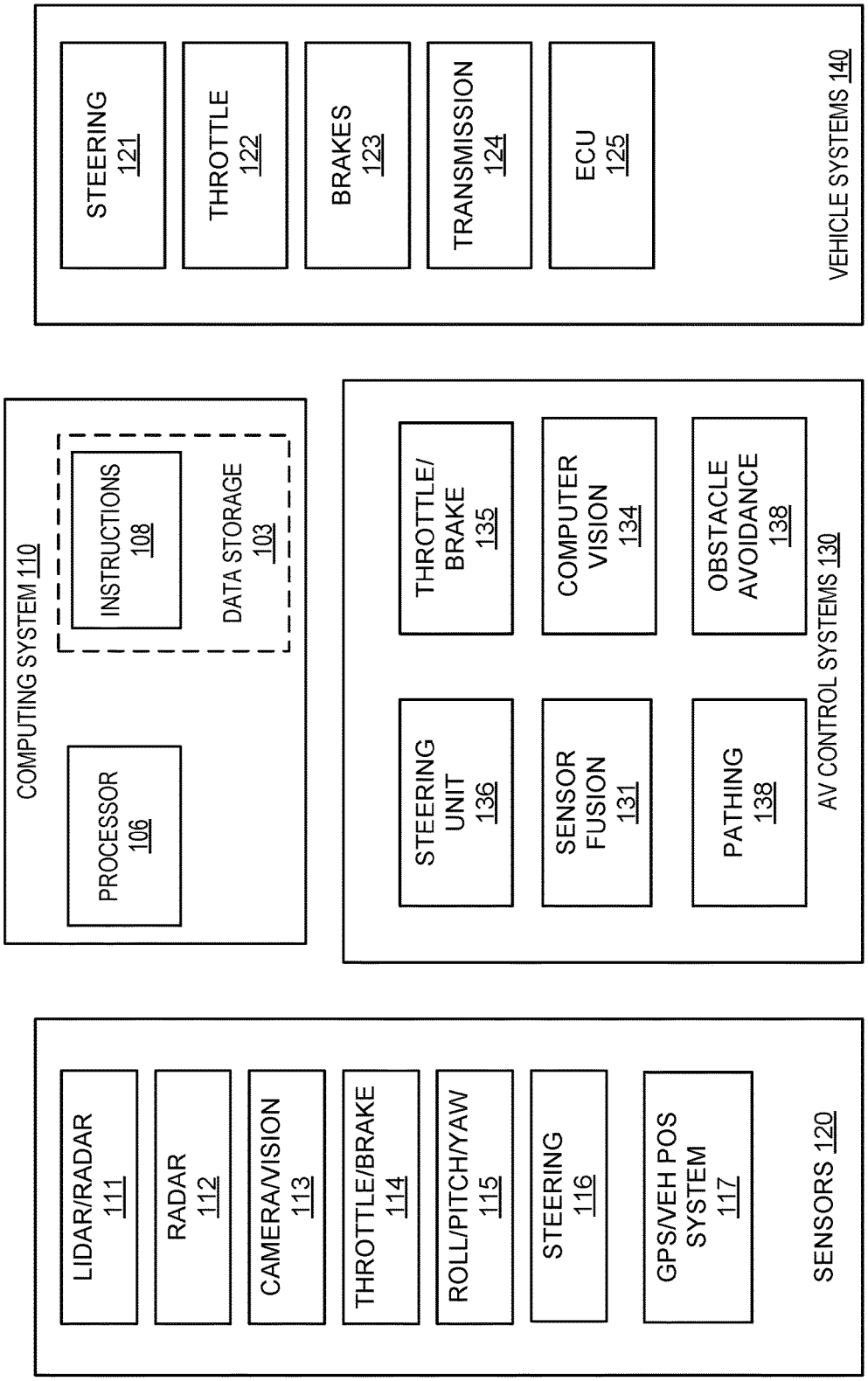
FIG. 1 illustrates an example autonomous or semi-autonomous vehicle with which embodiments of the disclosed technology may be implemented.

FIG. 1 illustrates an example autonomous or semi-autonomous vehicle with which embodiments of the disclosed technology may be implemented. In this example, vehicle 100 includes a computing system 110, sensors 120, AV control systems, 130 and vehicle systems 140. Vehicle 100 may include a greater or fewer quantity of systems and subsystems and each could include multiple elements. Accordingly, one or more of the functions of the technology disclosed herein may be divided into additional functional or physical components, or combined into fewer functional or physical components. Additionally, although the systems and subsystems illustrated in FIG. 1 are shown as being partitioned in a particular way, the functions of vehicle 100 can be partitioned in other ways. For example, various vehicle systems and subsystems can be combined in different ways to share functionality.

Sensors 120 may include a plurality of different sensors to gather data regarding vehicle 100, its operator, its operation and its surrounding environment. In this example, sensors 120 include lidar 111, radar 112, or other like the distance measurement sensors, image sensors 113, throttle and brake sensors 114, 3D accelerometers 115, steering sensors 116, and a GPS or other vehicle positioning system 117. One or more of the sensors 120 may gather data and send that data to the vehicle ECU or other processing unit. Sensors 120 (and other vehicle components) may be duplicated for redundancy.

Distance measuring sensors such as lidar 111, radar 112, IR sensors and other like sensors can be used to gather data to measure distances and closing rates to various external objects such as other vehicles, traffic signs, pedestrians, light poles and other objects. Image sensors 113 can include one or more cameras or other image sensors to capture images of the environment around the vehicle as well as internal to the vehicle. Information from image sensors 113 can be used to determine information about the environment surrounding the vehicle 100 including, for example, information regarding other objects surrounding vehicle 100. For example, image sensors 113 may be able to recognize landmarks or other features (including, e.g., street signs, traffic lights, etc.), slope of the road, lines on the road, curbs, objects to be avoided (e.g., other vehicles, pedestrians, bicyclists, etc.) and other landmarks or features. Information from image sensors 113 can be used in conjunction with other information such as map data or information from positioning system 117 to determine, refined or verify vehicle location.

Throttle and brake sensors 114 can be used to gather data regarding throttle and brake application by a human or autonomous operator. Accelerometers 115 may include a 3D accelerometer to measure roll, pitch and yaw of the vehicle. Accelerometers 115 may include any combination of accelerometers and gyroscopes for the vehicle or any of a number of systems or subsystems within the vehicle to sense position and orientation changes based on inertia.

Steering sensors 116 (e.g., such as a steering angle sensor) can be included to gather data regarding steering input for the vehicle by a human or autonomous operator. A steering sensor may include a position encoder monitor the angle of the steering input in degrees. Analog sensors may collect voltage differences that can be used to determine information about the angle and turn direction, while digital sensors may use an LED or other light source to detect the angle of the steering input. A steering sensor may also provide information on how rapidly the steering wheel is being turned. A steering wheel being turned quickly is generally normal during low-vehicle-speed operation and generally unusual at highway speeds. If the driver is turning the wheel at a fast rate while driving at highway speeds the vehicle computing system may interpret that as an indication that the vehicle is out of control. Steering sensor 116 may also include a steering torque sensor to detect an amount of force the driver is applying to the steering wheel.

Vehicle positioning system 117 (e.g., GPS or other positioning system) can be used to gather position information about a current location of the vehicle as well as other positioning or navigation information.

Although not illustrated, other sensors 120 may be provided as well. Various sensors 120 may be used to provide input to computing system 110 and other systems of vehicle 100 so that the systems have information useful to operate in an autonomous, semi-autonomous or manual mode.

AV control systems 130 may include a plurality of different systems/subsystems to control operation of vehicle 100. In this example, AV control systems 130 include steering unit 136, throttle and brake control unit 135, sensor fusion module 131, computer vision module 134, pathing module 138, and obstacle avoidance module 139. Sensor fusion module 131 can be included to evaluate data from a plurality of sensors, including sensors 120. Sensor fusion module 131 may use computing system 110 or its own computing system to execute algorithms to assess inputs from the various sensors.

Throttle and brake control unit 135 can be used to control actuation of throttle and braking mechanisms of the vehicle to accelerate, slow down, stop or otherwise adjust the speed of the vehicle. For example, the throttle unit can control the operating speed of the engine or motor used to provide motive power for the vehicle. Likewise, the brake unit can be used to actuate brakes (e.g, disk, drum, etc.) or engage regenerative braking (e.g., such as in a hybrid or electric vehicle) to slow or stop the vehicle.

Steering unit 136 may include any of a number of different mechanisms to control or alter the heading of the vehicle. For example, steering unit 136 may include the appropriate control mechanisms to adjust the orientation of the front or rear wheels of the vehicle to accomplish changes in direction of the vehicle during operation. Electronic, hydraulic, mechanical or other steering mechanisms may be controlled by steering unit 136.

Computer vision module 134 may be included to process image data (e.g., image data captured from image sensors 113, or other image data) to evaluate the environment within or surrounding the vehicle. For example, algorithms operating as part of computer vision module 134 can evaluate still or moving images to determine features and landmarks (e.g., road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on.

Pathing module 138 may be included to compute a desired path for vehicle 100 based on input from various other sensors and systems. For example, pathing module 138 can use information from positioning system 117, sensor fusion module 131, computer vision module 134, obstacle avoidance module 139 (described below) and other systems to determine a safe path to navigate the vehicle along a segment of a desired route. Pathing module 138 may also be configured to dynamically update the vehicle path as real-time information is received from sensors 120 and other control systems 130.

Obstacle avoidance module 139 can be included to determine control inputs necessary to avoid obstacles detected by sensors 120 or AV control systems 130. Obstacle avoidance module 139 can work in conjunction with pathing module 138 to determine an appropriate path to avoid a detected obstacle.

Vehicle systems 140 may include a plurality of different systems/subsystems to control operation of vehicle 100. In this example, AV control systems 130 include steering system 121, throttle system 122, brakes 123, transmission went 24, electronic control unit (ECU) 125 and propulsion system 126. These vehicle systems 140 may be controlled by AV control systems 130 in autonomous, semi-autonomous or manual mode. For example, in autonomous or semi-autonomous mode, AV control systems 130, alone or in conjunction with other systems, can control vehicle systems 140 to operate the vehicle in a fully or semi-autonomous fashion. This may also include an assist mode in which the vehicle takes over partial control or activates ADAS controls to assist the driver with vehicle operation.

Computing system 110 in the illustrated example includes a processor 106, and memory 103. Some or all of the functions of vehicle 100 may be controlled by computing system 110. Processor 106 can include one or more GPUs, CPUs, microprocessors or any other suitable processing system. Processor 106 may include one or more single core or multicore processors. Processor 106 executes instructions 108 stored in a non-transitory computer readable medium, such as memory 103.

Memory 103 may contain instructions (e.g., program logic) executable by processor 106 to execute various functions of vehicle 100, including those of vehicle systems and subsystems. Memory 103 may contain additional instructions as well, including instructions to transmit data to, receive data from, interact with, and/or control one or more of the sensors 120, AV control systems, 130 and vehicle systems 140. In addition to the instructions, memory 103 may store data and other information used by the vehicle and its systems and subsystems for operation, including operation of vehicle 100 in the autonomous, semi-autonomous or manual modes.

Although one computing system 110 is illustrated in FIG. 1, in various embodiments multiple computing systems 110 can be included. Additionally, one or more systems and subsystems of vehicle 100 can include its own dedicated or shared computing system 110, or a variant thereof. Accordingly, although computing system 110 is illustrated as a discrete computing system, this is for ease of illustration only, and computing system 110 can be distributed among various vehicle systems or components.

Vehicle 100 may also include a wireless communication system (not illustrated) to communicate with other vehicles, infrastructure elements, cloud components and other external entities using any of a number of communication protocols including, for example, V2V, V2I and V2X protocols. Such a wireless communication system may allow vehicle 100 to receive information from other objects including, for example, map data, data regarding infrastructure elements, data regarding operation and intention of surrounding vehicles, and so on. A wireless communication system may also allow vehicle 100 to transmit information to other objects. In some applications, computing functions for various embodiments disclosed herein may be performed entirely on computing system 110, distributed among two or more computing systems 110 of vehicle 100, performed on a cloud-based platform, performed on an edge-based platform, or performed on a combination of the foregoing.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
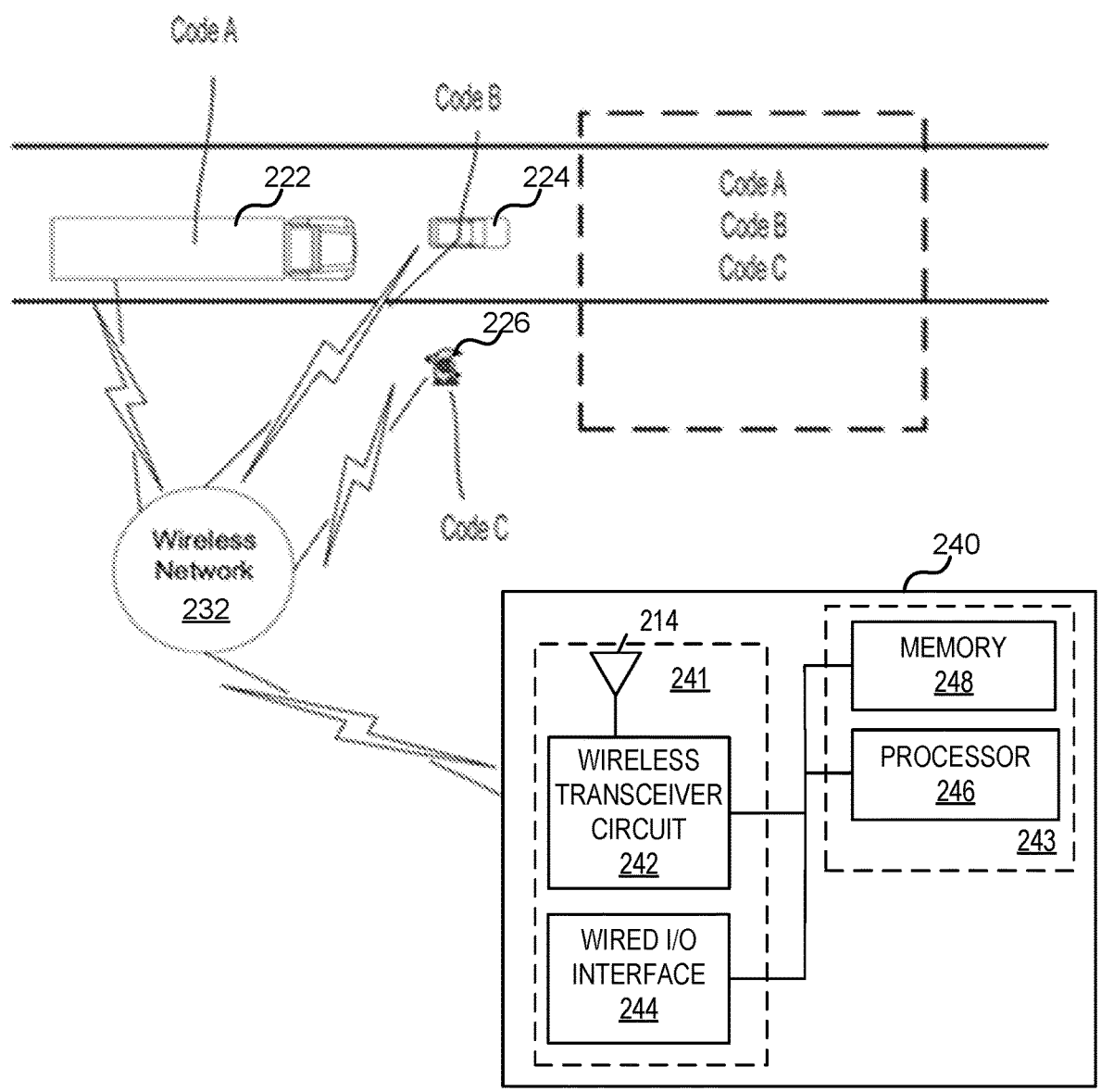
FIG. 2 illustrates an example of secure boundary area communication in accordance with various embodiments.

FIG. 2 illustrates an example of secure boundary area communication in accordance with various embodiments. Referring now to FIG. 2, this example illustrates three different types of mobile communication platform: a tractor-trailer 222, a passenger car 224, and a mobile device 226 such as, for example, a smartwatch or smart phone worn or carried by a cyclist, walker or other pedestrian. Each platform can be in communication with each other and with infrastructure elements (e.g., V2V, V2P and V2I, not illustrated) and with one or more wireless networks 232.

In These and other vehicles may communicate information through a wireless network 232 for a variety of reasons including, for example, to receive map updates, navigational assistance and perform other mobility management functions; to communicate through Lexus® Enform®, Toyota® Safety Connect® or other like platforms that provide communications relating to concierge services such as Automatic Collision Notification, SOS assistance, Stolen Vehicle Location and roadside assistance; to enable commerce related applications, including on-the-road purchases and tolls; to communicate information for maintenance tracking and breakdown prevention (e.g., to share data with backend algorithms that may predict failures or identify service needs); to provide entertainment functions; to provide driver assistance for partially or fully automatic driving and ADAS; and to communicate information to enhance or ensure driver/passenger well-being.

Some of the aforementioned and other communications may involve secure or otherwise sensitive data. This can include personal information about the driver and passengers such as, for example, health related data, bank or payment information, and other personal information. This might also include information pertaining to the autonomous or semi-autonomous operation of the vehicle. Accordingly, in many instances it may be desirable to provide a six secure communication channel for this and other sensitive information.

The example scenario in FIG. 2 shows an example of a secure communication zone 252 the boundaries of which are described by the dashed lines. While vehicles may in many instances communicate with other instrumentalities outside of these bounds, it may be desired that secure communications only occur within the balance of secure communication zone 252. In some applications, secure communication zones 252 may be geofenced areas and may be defined as having a fixed size and a fixed location, while another applications the size and location of one or more secure communication areas may be dynamic such that either or both of the size and location can be changed depending on secure communication needs. Secure communication zones 252 may be constrained, for example, based on the availability of secure network channels, which might be defined by the communication capabilities (e.g., encryption capability, availability of secure channels, or the like) of the equipment that makes up that portion of the network. Other factors might constrain the boundaries and locations of one or more secure communication zones 252.

The example of FIG. 2 also illustrates a backend server such as a cloud server or other computing device that can be used to coordinate secure communications for various vehicles. For simplicity, the computing capability in this example is described as a single secure communication boundary area computing system 240 located in the cloud. Although illustrated and described as a single network device, this computing system can be located on board the vehicle or it can be implementing using edge computing, for example, distributed across a plurality of vehicles. The functionality of secure communication boundary area communication system 240 can also be distributed among one or more vehicles and one or more servers.

Secure communication boundary area computing system 240 in this example includes a communication circuit 241, and a decision circuit 243 (including a processor 246 and memory 248 in this example). Components of secure communication boundary area computing system 240 are illustrated as communicating with each other via a data bus, although other communication in interfaces can be included.

Processor 246 can include one or more GPUs, CPUs, microprocessors, or any other suitable processing system. Processor 246 may include a single core or multicore processors. The memory 248 may include one or more various forms of memory or data storage (e.g., flash, RAM, etc.) that may be used to store the calibration parameters, images (analysis or historic), point parameters, instructions and variables for processor 246 as well as any other suitable information. Memory 248, can be made up of one or more modules of one or more different types of memory, and may be configured to store data and other information as well as operational instructions that may be used by the processor 246 to secure communication boundary area computing system 240.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a secure communication boundary area computing system 240.

Communication circuit 241 includes a wireless transceiver circuit 242 with an associated antenna 214 and a wired I/O interface 244 with an associated hardwired data port (not illustrated). As this example illustrates, communications with secure communication boundary area computing system 240 can include either or both wired and wireless communications circuits 241. Wireless transceiver circuit 242 can include a transmitter and a receiver (not shown) to allow wireless communications via any of a number of communication protocols whether standardized, proprietary, open, point-to-point, networked or otherwise. Antenna 214 is coupled to wireless transceiver circuit 242 and is used by wireless transceiver circuit 242 to transmit radio signals wirelessly to wireless equipment with which it is connected and to receive radio signals as well. These RF signals can include information of almost any sort that is sent or received by secure communication boundary area computing system 240 to/from other entities such as sensors 152 and vehicle systems 158.

Wired I/O interface 244 can include a transmitter and a receiver (not shown) for hardwired communications with other devices. For example, wired I/O interface 244 can provide a hardwired interface to other components, including sensors 152 and vehicle systems 158. Wired I/O interface 244 can communicate with other devices using Ethernet or any of a number of other wired communication protocols whether standardized, proprietary, open, point-to-point, networked or otherwise.

During operation, secure communication boundary area computing system 240 can receive information from various vehicle systems and sensors to determine parameters that may be useful for coordinating secure data transfer. These parameters may include, for example, information regarding data to be uploaded from or downloaded to the vehicle (e.g., datatypes, file sizes, etc.), security requirements information for such data to be uploaded or downloaded, vehicle type information, vehicle speed and direction of travel and other information.

Secure communication boundary area computing system 240 may also be configured to receive and store information relating to one or more secure communication zones 252. This may include, for example, information about these areas such as geofence boundaries; secure communication capabilities within the secure communication zones 252; speed limits, average speed or other velocity information within the boundaries of secure communication zones 252; and so on.

Instructions in memory 248 may be configured to cause boundary area computing system 242 perform the steps to coordinate a secure data transfer. This can include, for example, determining that a secure data transfer is required or desired for a given vehicle, determining the size of files to be uploaded or downloaded for the secure data transfer, determining a level of security required for the transfer, determining vehicle parameters of the subject vehicle (e.g., such as velocity, direction of travel, and a route along which the vehicle is intended to travel), determining a distance required to complete the transfer based on file size and vehicle velocity and assigning a secure file transfer area based on the distance required. In some embodiments, secure file transfer area can be defined dynamically in real-time (e.g., on the fly) when a communication requirement is determined. In other embodiments, the secure transfer can be scheduled to occur during one or more upcoming secure communication zones 252 along the vehicle's predicted route.

The example of FIG. 2 also illustrates the use of codes to assist with vehicle classification. The illustrated example includes three codes, Code A, Code B, and Code C. In this example, Code A is assigned to a tractor-trailer 222, Code B is assigned to passenger car 224 and Code C is assigned to mobile device 226. These codes can be used, for example, to identify a type or class of vehicle. Although three different classes are shown, any of a number of different classes can be utilized. Moreover, a higher level of granularity can be used beyond the three levels depicted here. For example, different types of passenger cars can be assigned different codes (e.g., sports cars, small sedans, large sedans, crossovers, large SUVs, pickup trucks, economy vehicles, luxury vehicles, and so on).

In various embodiments, each code can be associated with a number of vehicle parameters that typically apply to the vehicle class or type represented by code. For example, vehicles in Code A may be identified as tractor-trailers, may be defined as traveling within certain speed windows on certain road types, identified as following certain routes (which may be useful where routing information such as the right navigation system is not available), and so on. Accordingly, in some embodiments secure communication boundary area computing system 240 may simply receive the vehicle's code along with secure data transfer requirements and make the determinations based on information associated with the vehicle type or class within that code. This can reduce data transfer requirements by avoiding the need to send additional information about vehicle speed, for example. In some embodiments, a vehicle may be configured to recognize whether it is performing within the parameters defined for its type or class and, if not performing within such parameters, to provide additional information to secure communication boundary area computing system 240 such that secure communication boundary area communication system 240 has accurate information.

As a further example, codes may be used to define other parameters/capabilities of the coded vehicles. For example, the codes may identify the type of information that a vehicle may have. Further to this example, when a semi is identified, additional information might include payload information (e.g., whether hazardous or perishable, or the specific type of payload), payload weight, total vehicle weight, gross vehicle weight rating (GVWR), origin and destination, amount of hours on the road, special licensing information and so on. The codes may also define communication capabilities of the vehicle type or class. For example, some vehicle classes may have higher bandwidth communication capabilities or needs while others have lower bandwidth capabilities or needs. Accordingly, the codes can be used to determine what data more datatypes can be transferred and how much data the system should expect to be able to be transferred.

Figure 3:
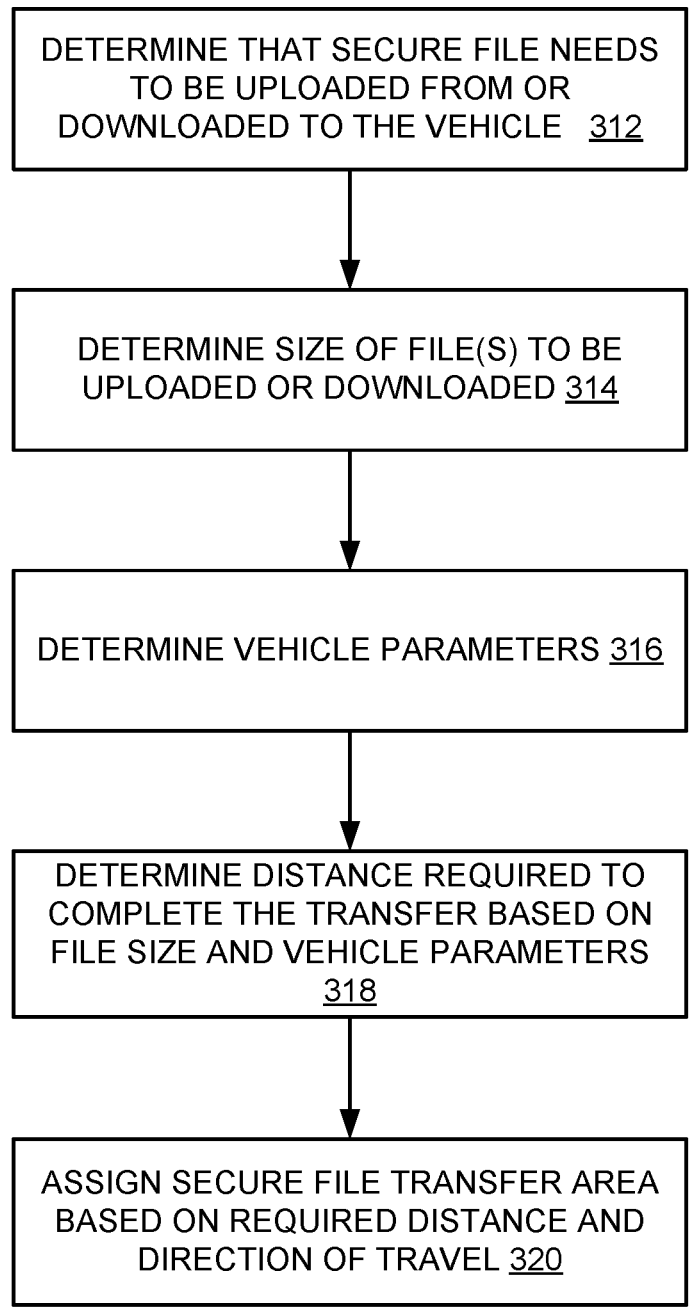
FIG. 3 is a diagram illustrating an example process for secure boundary area communications in accordance with one embodiment.

FIG. 3 is a diagram illustrating an example process for secure boundary area communications in accordance with one embodiment. With reference now to FIG. 3, at operation 312 a secure communication system (e.g., secure communication boundary area communication system 240) determines that a secure file needs to be uploaded from or downloaded to a vehicle. The secure communication system can be, for example, part of other infrastructure equipment that may otherwise be in communication with the vehicle. This determination can be made based on communications with the vehicle. For example, during the course of communications the vehicle may indicate that it has a secure communication requirement (e.g. an upload or a download) that needs to be fulfilled. As another example, secure communication requirements can be scheduled in advance such as, for example, based on known requirements or as part of a periodic scheduled event.

At operation 314, the secure communication system determines the size of the file or files to be transferred (e.g., uploaded or downloaded) between the vehicle and another instrumentality. Where the vehicle has a file or files to upload, the vehicle can provide file size information to the secure communication system. This can include, for example, the number of bytes to be transferred.

At operation 314, the secure communication system determines vehicle parameters. These can include any of a number of parameters that may be useful in determining the amount of time or distance necessary to complete the subject secure file transfer. As noted above, in some embodiments some or all of these parameters may be predefined and associated with a particular vehicle code (e.g., Code A, Code B, Code C, as described above in FIG. 2). In other embodiments, some or all of these parameters may be uploaded by the vehicle to the secure communication system. Vehicle speed is one example of a parameter that can be used to determine the amount of distance necessary to complete the subject secure file transfer. Where secure communication areas are defined or created in the system along certain areas of a vehicle's path, the speed limit of the road segment or segments within the secure communication areas can be used to further inform a prediction as to speed of the vehicle through a secure communication area.

Speed limit information can be combined with collected driver behavior information to perform a refined prediction of speed through a secure communication area. For example, where historic driver information indicates that the driver tends to operate the vehicle at speeds 6-10 mph over the speed limit, the system may assume that the driver will likewise be exceeding the limit by a similar amount as he or she pilots the vehicle through a secure communication area.

Refined velocity predictions might also be made based on crowd sourced data. For example, or data from a plurality of vehicles indicates the vehicles tend to drive within a particular range of speeds through a given area, this information may be used to refined prediction of vehicle speed in that area. Further to this example, crowd sourced data may indicate that drivers tend to operate their vehicles faster on prolonged down-sloping stretches and slower on prolonged up-sloping stretches. Accordingly, average speeds or speed envelopes (e.g., based on a Gaussian distribution of speeds) on particular road segments (e.g., uphill segments and downhill segments) can be used to inform the speed prediction.

Other information can be used to inform the system's prediction of vehicle speed through a secure communication area. For example, information regarding road construction, inclement weather, a present road hazard, presence of Highway Patrol or other factors are pieces of information that might be used by the system to reduce the vehicle speed predicted by the system. Likewise, the existence of special events such as concerts, sporting events, graduations, and so on can be used to inform the prediction. Still further, time of day traffic variations can also be used to inform the prediction of vehicle speed.

Another vehicle parameter that can be collected by the secure communication system is routing information or direction of travel. Direction of travel can be used by the secure indication system to determine whether the vehicle is headed toward one or more defined secure communication areas (e.g., secure communication zones 252). Routing information may provide more definitive information than direction of travel and can be used to identify one or more secure communication areas along the exact route identified by the vehicle. To the extent routing information changes, the vehicle may provide updated routing information to the secure adjudication system so that the identification of secure communication areas can likewise be updated according to the new route. Routing information may be provided, for example, by the vehicle's navigation system or navigation app.

At operation 318, the system uses file size and predicted vehicle speed to determine the distance required to complete the file transfer. For example, if it is known how much time is required to transfer the subject amount of data, the system can multiply this time by the vehicle speed to determine the distance required for the transfer in accordance with the following equation:

$$d = v * T_t$$

where D is the distance, v is the predicted velocity and $T_t$ is the amount of time required for the secure data transfer. Given the file size, available data rates within the secure communication zone intended for the transfer can be used to predict the transfer time required in accordance with the following equation:

$$T_t = \frac{S}{R}$$

Where S is the file size and R, is the data rate of the transfer.

Combining these two equations yields:

$$d = v * \frac{S}{R}$$

The system may be configured to provide a distance cushion in the event the vehicle actually travels through the secure communication area faster than predicted.

At operation 320, the secure communication system assigns a secure communication area to the subject data transfer. For example, the assignment can be based on the distance required to complete the subject transfer (e.g., as computed above) and the distance spanned by one or more available secure communication areas in the direction of travel, or along the route to be traveled by, the subject vehicle. In some applications the system may assign multiple secure communication areas where one area is not sufficient to communicate the volume of data scheduled for transfer.

In some embodiments, the assignment can be made based on one or more available secure communication areas that may be pre-existing and positioned along the predicted path of travel of the vehicle. The assignment might be made without adjusting the boundaries of those geo-fenced areas either because the secure communication areas are fixed and not able to be redefined or because the secure transfer can fit adequately within one or more of these areas.

In other embodiments, the establishment or sizing of secure communication areas can be dynamic to adapt to different secure transfer data volumes. As one example, a secure communication area can be established to accommodate the secure transfer, which might be useful in circumstances where one or more secure communication areas are not otherwise available to complete the data transfer in time as another example, an existing secure communication area can be adapted to increase its boundaries (e.g., to lengthen it along the direction of the roadway) to provide greater traveling distance over which the secure communication can take place. Accordingly, systems and methods can be implemented to adapt the availability, location and size to accommodate data transfers.

The adaptation is not limited to increasing the availability of secure communication zones, but adaptation may also be used to decrease the availability where secure communication requirements have lessened. For example, the system can be configured to temporarily (or permanently) dismantle or disable a secure communication zone when there are no secure transfers pending or anticipated. As another example, the system can be configured to shrink a secure communication zone when secure transfer volumes are light. Lessening the availability of secure communication zones might be beneficial, for example, where communication resources are expensive or in high demand for other uses.

As noted above, a secure communication area can be defined by the level of security offered for data transfers within that zone. For example, in some applications, the level of security offered may be to require Public Key Certificates with unlimited (or limited) validity periods. As another example, in some applications the level of security offered may require private key encryption. As a further example, some applications may provide an increased level of security that offers both encryption as well as an increased level of hardware security. Increased levels of hardware security might include, for example, physical premises security for equipment that makes up all or part of the network, tamper resistant or tamper evident enclosures, fiber-optic communication links, and so on.

In some embodiments, the system may be configured to predict vehicle routing or future positioning beyond the current route. Machine learning techniques can be implemented to allow the system to learn behavior of vehicle types or classes, individual vehicles or vehicle operators or passengers. For example, data may be collected on various vehicles and patterns may be learned for vehicle travel. These patterns can be used to predict vehicle speed as it will travel through the secure communication zone or zones. These patterns can also be used to predict that the vehicle may enter a secure communication zone at a particular date and time, such as, for example, later in the day, tomorrow, or the next day or the next week or at some time in the future. In the case of a tractor-trailer, for example, the secure communication system may learn that the rig typically makes a round-trip. Accordingly, if the secure communication zone is not large enough to accommodate the secure data transfer during the outbound leg, the system may be configured to start the secure data transfer when the vehicle enters the geo-fenced secure communication zone and stop the data transfer when it exits the secure communication zone. The system may then schedule the balance of the transfer during the return leg. The decision whether to add a new secure communication zone or adjust the existing communication zone versus scheduling for the return trip can be weighted based on factors such as predictability of the vehicle making the return leg of the journey, the predicted amount of time elapsed between the outbound leg and the return leg, time sensitivity of the information, and so on. As another example, the system may be configured to learn other regular patterns such as a driver's or vehicle's commuting patterns and use these patterns to schedule secure data transfers across multiple separate trips. Because some of this analysis may be driver- or passenger- or cargo-based as opposed to or in addition to vehicle-based, embodiments can be implemented to retrieve an identification of a subject vehicle's driver, passengers or payload.

Figure 4:
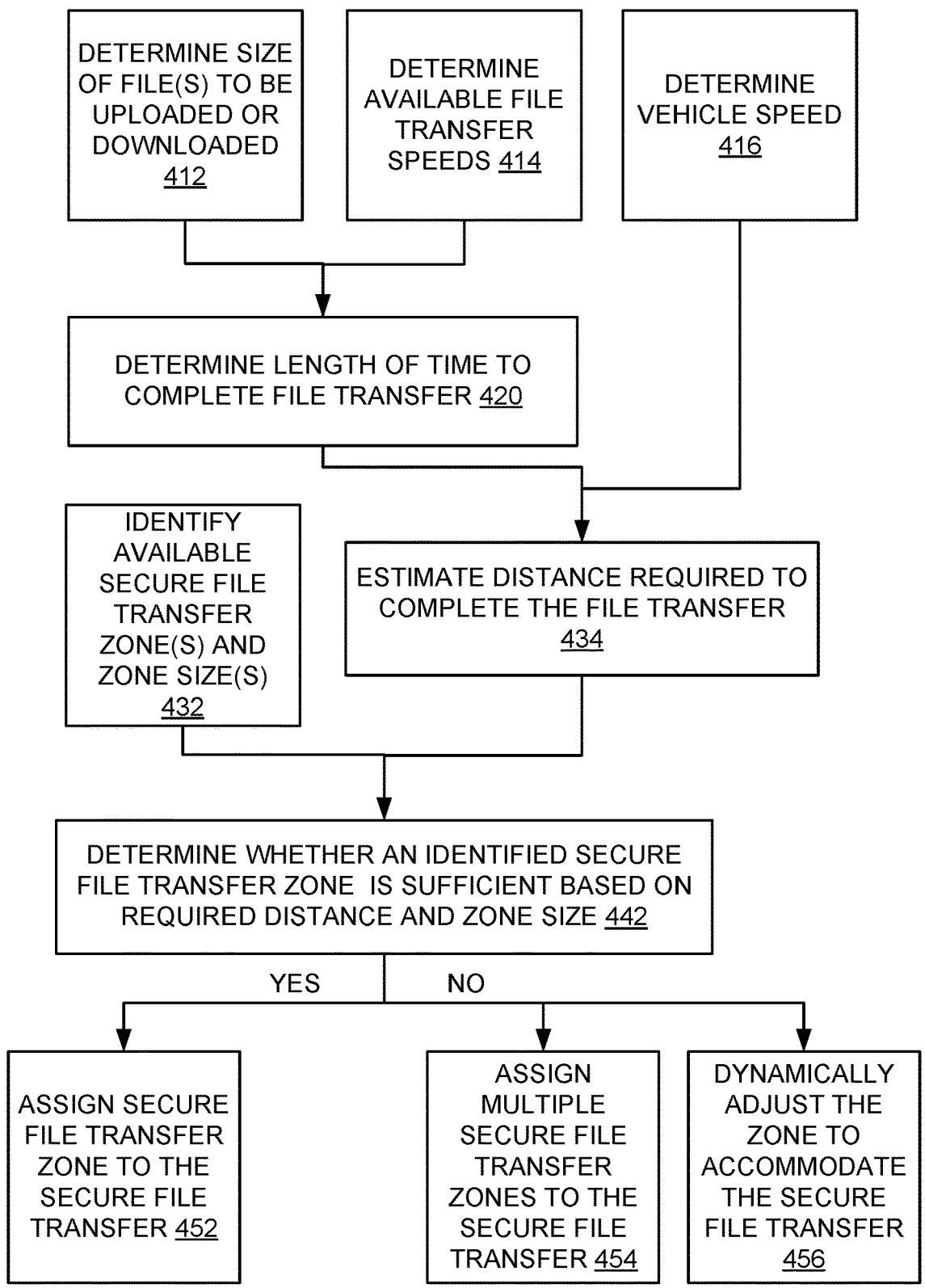
FIG. 4 is a diagram illustrating another example process for secure file transfer in accordance with various embodiments.

FIG. 4 is a diagram illustrating another example process for secure file transfer in accordance with various embodiments. Referring now to FIG. 4, at operation 412, upon a determination that a secure transfer is required, the secure communication system determines the size of secure files to be uploaded or downloaded during the secure transfer.

At operation 414, the secure communication system determines the transfer speeds, or data rates, at which the secure files can be transferred. Available transfer speeds may be dependent on limitations of the vehicle hardware, data rate limitations of the network components servicing the secure communication zone, volume of actual or anticipated traffic on the network, and other factors that can affect data transfer rates. Because the data transfer rates can be dependent on characteristics of the secure communication zone, in some embodiments, the system may be required to identify available secure communication transfer zones (operation 432) prior to determining available data transfer speeds.

At operation 416, the secure communication system determines the subject vehicle speed. In some embodiments, the system may use the existing vehicle speed and assume that the vehicle will be maintaining the speed (or this speed within +/−5% or 10% or some other determined amount) in the immediate future. This assumption may be valid for secured communication zones that are close to the vehicle on a similar road segment. As described above, in other embodiments the vehicle speed determined at operation 416 can be a predicted speed based on a number of factors used to estimate the speed of the subject vehicle through one or more available (or to be created) secure communication zones. In some embodiments, this can be computed as the predicted average speed of the vehicle through the secure communication zone. Predicting an average bead may be useful where instantaneous vehicle speed is expected to change as the vehicle travels through the security medications on. In embodiments where vehicle speed is predicted based on zone location or placement, zones may be identified in advance (e.g., operation 432) of predicting the vehicle speed.

At operation 420, based on the determined size of the secure information to be transferred (e.g., file size) and based on available data transfer rates, the secure communication system determines the length of time to complete the file transfer. As described above, this can be computed based on the following formula:

$$T_t = \frac{S}{R}$$

At operation 434, the secure communication system estimates a distance required to complete the secure transfer. As described above, this is a function of the amount of time required to complete the transfer and the distance the vehicle should travel in that time based on the predicted vehicle speed. In some embodiments, the system may place a cushion on the distance required to accommodate the contingency that the vehicle might travel faster through the secure communication zone than predicted.

At operation 442, secure communication system determines whether one or more available secure communication zones will provide sufficient travel distance based on the computed distance required for the transfer and the zone size. If the identified secure communication zone or zones is sufficient to accommodate the travel distance required for the transfer (including with a cushion in some embodiments) the system assigns that secure communication zone to the subject secure file transfer. The system may instruct the vehicle to begin the transfer (initiate and upload or request a download) when it reaches the geo-fence boundary of the identified secure communication zone or zones. Accordingly, in some embodiments the secure communication system may download to the vehicle boundaries for the secure communication zone or zones within which the secure transfer will take place. In some applications, zone boundaries and identifications can be preloaded onto the vehicle, such as during route planning or otherwise. Where zone boundaries and identifications are preloaded, secure communication system might only identify the appropriate secure communication zone or zones within which the transfer is to take place.

If the secure communication system determines that an available secure communication zone will not provide sufficient travel distance for the secure communication transfer, secure communication system may assign multiple secure communication zones to the secure data transfer tasks. This is illustrated at operation 454. As another option, if the secure communication system determines that an available secure communication zone will not provide sufficient travel distance for the secure communication transfer, the system may dynamically adjust the zone to accommodate the secure communication transfer. For example, the system may lengthen the zone along the roadway such that the vehicle has more travel time to complete the transfer.

If a secure communication zone is not available at a location to complete the transfer by the time required for completion, or one or more zones are available but too short to accommodate, the transfer, the secure communication system can dynamically adjust the size of one or more existing secure communication zones to accommodate the transfer. In some embodiments, the secure communication system can be configured to dynamically create a new secure transfer zone or multiple new secure transfer zones to accommodate the secure communication transfer. In further embodiments, secure communication system can be configured to both dynamically adjust one or more existing secure communication zones and dynamically create one or more new secure communication zones to accommodate the transfer.

Secure communication zones may be dynamically created, resized, removed or otherwise changed, including changing the security parameters, to better meet scenarios as they are occurring. For example, consider the case of creating a geo-fence zone for the purpose of toll collection. Further consider a scenario in which a special event (e.g., sporting event, concert, etc.) is taking place in a given part of town. One or more dynamic toll plazas can be erected virtually to turn an otherwise open thoroughfare into a toll road for purposes of revenue generation, traffic reduction or other purposes. Dynamic toll plazas can be erected and placed where desired to achieve these and other objectives. Vehicles entering these zones can be requested to upload payment information, which may be secure, for purposes of paying the toll. Additionally, drivers can be warned, such as via V2I communications with infrastructure elements in advance of reaching a toll-bearing road segment. As a similar example, dynamic toll plazas can be erected virtually to turn an otherwise open parking area into a pay-for-parking area in a similar manner.

Figure 5:
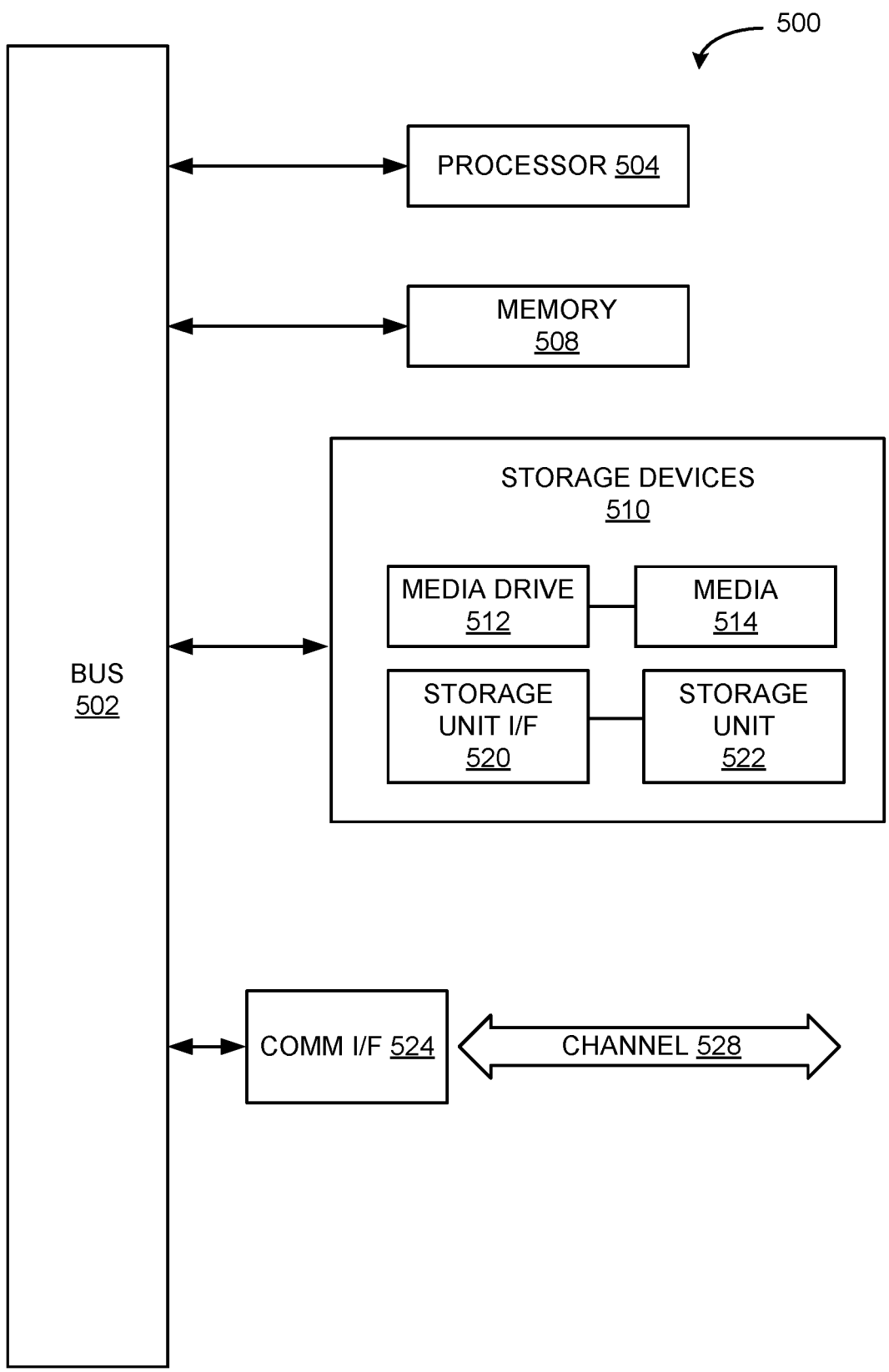
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for secure data transfer with a vehicle, the method comprising:
   determining a size of a file to be transferred to or from the vehicle;
   determining a data transfer speed at which the file may be transferred;
   based on the size of the file and transfer speed, determining a travel distance of the vehicle needed to complete transfer of the file; and
   dynamically creating a secure data transfer zone in which to perform the transfer of the file within the determined travel distance, wherein the secure data transfer zone comprises a dynamic virtual toll plaza at a determined location, and further wherein vehicles entering the dynamic virtual toll plaza upload secure payment information for purposes of paying a toll associated with the dynamic virtual toll plaza.

2. The method of claim 1, further comprising dynamically changing boundaries of the created secure data transfer zone to accommodate the determined travel distance for the transfer, and assigning the identified secure data transfer zone for the transfer.

3. The method of claim 1, wherein the dynamically created secure data transfer zone comprises a plurality of secure data transfer zones of sufficient cumulative size to perform the transfer of the file.

4. The method of claim 1, further comprising adjusting boundaries of one or more of a plurality of dynamically created secure data transfer zones so that the plurality of secure data transfer zones comprise sufficient cumulative size to accommodate the determined travel distance.

5. The method of claim 1, wherein dynamically creating a secure data transfer zone comprises dynamically creating a plurality of new secure data transfer zones of sufficient size to accommodate the determined travel distance needed to complete transfer of the file.

6. The method of claim 1, further comprising predicting a speed of the vehicle during the vehicle's travel through the created secure data transfer zone, and further using the predicted vehicle speed to determine the travel distance of the vehicle needed to complete transfer of the file.

7. The method of claim 1, further comprising predicting a path of the vehicle, determining one or more existing secure data transfer zones in the path of the vehicle predicted, and assigning one or more of the one or more existing secure data transfer zones in combination with the dynamically created secure data transfer zone to complete transfer of the file.

8. The method of claim 7, dynamically adjusting the assigned one or more existing secure data transfer zones such that the assigned one or more existing secure data transfer zones in combination with the dynamically created secure data transfer zone are of sufficient geometry to complete transfer of the file.

9. The method of claim 7, wherein predicting a path of the vehicle is performed using machine learning.

10. The method of claim 1, wherein a size of the secure data transfer zone is determined based on the determined travel distance and based on a size of the file and the data transfer speed such that the file can be transferred while the vehicle is traveling within the secure data transfer zone.

11. A system for secure vehicle communication, comprising:
  a processor; and
  a memory coupled to the processor to store instructions, which when executed by the processor, cause the processor to perform operations, the operations comprising:
    determining a size of a file to be transferred to or from the vehicle;
    determining a data transfer speed at which the file may be transferred;
    based on the size of the file and data transfer speed, determining a travel distance of the vehicle needed to complete transfer of the file; and
    dynamically creating a secure data transfer zone in which to perform the transfer of the file within the determined travel distance, wherein the secure data transfer zone comprises a dynamic virtual toll plaza at a determined location, and further wherein vehicles entering the dynamic virtual toll plaza upload secure payment information for purposes of paying a toll associated with the dynamic virtual toll plaza.

12. The system of claim 11, further comprising dynamically changing boundaries of the created secure data transfer zone to accommodate the determined travel distance for the transfer, and assigning the identified secure data transfer zone for the transfer.

13. The system of claim 11, wherein the dynamically created secure data transfer zone comprises a plurality of secure data transfer zones of sufficient cumulative size to perform the transfer of the file.

14. The system of claim 11, wherein the operations further comprise adjusting boundaries of one or more of a plurality of dynamically created secure data transfer zones so that the plurality of secure data transfer zones comprise sufficient cumulative size to accommodate the determined travel distance.

15. The system of claim 11, wherein dynamically creating a secure data transfer zone comprises dynamically creating a plurality of new secure data transfer zones of sufficient size to accommodate the determined travel distance needed to complete transfer of the file.

16. The system of claim 11, wherein the operations further comprise predicting a speed of the vehicle during the vehicle's travel through the created secure data transfer zone, and further using the predicted vehicle speed to determine the travel distance of the vehicle needed to complete transfer of the file.

17. The system of claim 11, wherein the operations further comprise predicting a path of the vehicle, determining one or more existing secure data transfer zones in the path of the vehicle predicted, and assigning one or more of the one or more existing secure data transfer zones in combination with the dynamically created secure data transfer zone to complete transfer of the file.

18. The system of claim 17, dynamically adjusting the assigned one or more existing secure data transfer zones such that the assigned one or more existing secure data transfer zones in combination with the dynamically created secure data transfer zone are of sufficient geometry to complete transfer of the file.

19. The system of claim 17, wherein predicting a path of the vehicle is performed using machine learning.

20. The system of claim 11, wherein a size of the secure data transfer zone is determined based on the determined travel distance and based on a size of the file and the data transfer speed such that the file can be transferred while the vehicle is traveling within the secure data transfer zone.

21. A non-transitory machine-readable medium having instructions stored therein, which when executed by a processor, cause the processor to perform operations, the operations comprising:
  determining a size of a file to be transferred to or from a vehicle;
  determining a data transfer speed at which the file may be transferred;
  based on the size of the file and transfer speed, determining a travel distance of the vehicle needed to complete transfer of the file; and
  dynamically creating a secure data transfer zone in which to perform the transfer of the file within the determined travel distance, wherein the secure data transfer zone comprises a dynamic virtual toll plaza at a determined location, and further wherein vehicles entering the dynamic virtual toll plaza upload secure payment information for purposes of paying a toll associated with the dynamic virtual toll plaza.

22. The non-transitory machine-readable medium of claim 21, wherein a size of the secure data transfer zone is determined based on the determined travel distance and based on a size of the file and the data transfer speed such that the file can be transferred while the vehicle is traveling within the secure data transfer zone.

\* \* \* \* \*